(12) United States Patent
Chou

(10) Patent No.: US 9,656,721 B2
(45) Date of Patent: May 23, 2017

(54) ADJUSTABLE PLATFORM PEDAL FOR USE WITH CLIPLESS PEDAL AND METHOD FOR ADJUSTABLE PLATFORM PEDAL ON CLIPLESS PEDAL

(71) Applicant: Zernyu Chou, Chicago City, IL (US)

(72) Inventor: Zernyu Chou, Chicago City, IL (US)

( * ) Notice: Subject to any disclaimer, the term of this patent is extended or adjusted under 35 U.S.C. 154(b) by 0 days.

(21) Appl. No.: 14/337,228

(22) Filed: Jul. 22, 2014

(65) Prior Publication Data
US 2015/0114173 A1    Apr. 30, 2015

(30) Foreign Application Priority Data

Oct. 25, 2013   (TW) .............................. 102138566 A

(51) Int. Cl.
*B62M 3/00*    (2006.01)
*B62M 3/08*    (2006.01)

(52) U.S. Cl.
CPC ............ *B62M 3/086* (2013.01); *Y10T 74/217* (2015.01)

(58) Field of Classification Search
CPC .......... B62M 3/086; B62M 3/083; A43B 5/14
USPC ........................................................ 74/594.6
See application file for complete search history.

(56) References Cited

U.S. PATENT DOCUMENTS

| | | | | |
|---|---|---|---|---|
| 4,205,467 A * | 6/1980 | Salomon | .............. | A43B 5/0445<br>36/117.7 |
| 4,932,287 A * | 6/1990 | Ramos | .................. | B62M 3/086<br>36/131 |
| 5,046,382 A * | 9/1991 | Steinberg | ............... | B62M 3/086<br>36/131 |
| 5,199,324 A * | 4/1993 | Sain | ......................... | B62M 3/08<br>36/131 |
| 5,269,200 A * | 12/1993 | Hawkins | ................ | B62M 3/086<br>36/131 |
| 5,575,184 A * | 11/1996 | De Schrijver | ......... | B62M 3/086<br>74/594.6 |
| 5,992,266 A * | 11/1999 | Heim | ..................... | B62M 3/086<br>74/594.4 |
| 6,076,427 A * | 6/2000 | Nutto | ..................... | B62M 3/086<br>74/594.4 |
| 6,331,007 B1 * | 12/2001 | Bryce | ...................... | A43B 5/00<br>280/11.3 |

(Continued)

FOREIGN PATENT DOCUMENTS

| DE | 3924601 A1 * | 1/1991 | ............ B62M 3/086 |
|---|---|---|---|
| FR | 986455 A * | 8/1951 | ............ B62M 3/083 |

(Continued)

*Primary Examiner* — Vicky Johnson
(74) *Attorney, Agent, or Firm* — Chun-Ming Shih

(57) ABSTRACT

An adjustable pedal for use with a clipless pedal includes a pedal body that includes a passage formed therein, a driving member that is mounted in the pedal body, a first cleat and a second cleat that are coupled to the driving member and are located in the passage for being engageable with and attachable to a clipless pedal. When the driving member is operated in a first state, the first cleat and the second cleat are driven in such a way that the first cleat and the second cleat are moved toward each other in the passage; and when the driving member is operated in a second state, the first cleat and the second cleat are driven in such a way that the first cleat and the second cleat are moved away from each other in the passage.

6 Claims, 9 Drawing Sheets

(56) References Cited

U.S. PATENT DOCUMENTS

2012/0125148 A1\* 5/2012 Inoue .................... B62M 3/086
74/594.6

FOREIGN PATENT DOCUMENTS

FR 2598996 A2 \* 11/1987 ............ B62M 3/086
FR 2612869 A1 \* 9/1988 ............... A43B 5/14

\* cited by examiner

ADJUSTABLE PLATFORM PEDAL FOR USE WITH CLIPLESS PEDAL AND METHOD FOR ADJUSTABLE PLATFORM PEDAL ON CLIPLESS PEDAL

(a) TECHNICAL FIELD OF THE INVENTION

The present invention generally relates to an adjustable pedal usable with a clipless pedal, and more particularly to a pedal and a method for mounting to and dismounting from a clipless pedal.

(b) DESCRIPTION OF THE PRIOR ART

For busy modern people, to get themselves relaxed in leisure time after work, various leisure activities have been developed and cycling is one of these activities.

If a rider, when riding a bicycle, unduly applies an excessive force to the pedals or simply loses traction, the rider's feet may not remain stably and firmly on the bicycle pedals, while the transmission system that is still in operation may cause the pedals of the bicycle to continue to rotate, eventually leading to the pedals striking the rider's legs. This may cause injury to the rider's legs due to being hit by the pedals or more severely, the rider may lose balance, which may cause unexpected influence on vehicles behind the bicycle, and an accident that involves a casualty may result.

A clipless system (see FIG. 1) is available which generally comprises of a fastening mechanism (which is a clipless mechanism) mounted on pedals P of a bicycle. Cleat shoes S that correspond to the clipless mechanism are put on the feet of a rider. With such cleat shoes S, the rider may use the cleat shoes S on the feet to engage and stably remain on the clipless pedals P, which is often referred to as cleat engagement, so as to avoid the above problems. To stop riding, the rider simply twists the heels sideways to separate the cleat shoes S from the clipless pedals P, this being referred to as cleat disengagement or cleat separation, to allow the feet to stand on the ground. The clipless system helps prevent the above-described safety problem and also helps one foot to pull upward with the downward pedaling movement of the other foot so as to make the pedaling process smooth and easy.

However, during certain occasions or for certain situations of the roads, the rider may not need the clipless system. Under such conditions, the cleat shoes S and the clipless pedals P become troublesome (for they need repeated operations of cleat engagement and cleat disengagement). Such a problem can be easily handled by replacing the cleat shoes with ordinary shoes, but the rider must carry two pairs of shoes of different styles. This is certainly a problem for the bicycle rider who needs to carry as little gear as possible.

In light of these problems, the present invention aims to provide a novel technical solution that brings improvements to society and also helps prompt the development of the industry.

SUMMARY OF THE INVENTION

The present invention provides an adjustable pedal for use with a clipless pedal, which comprises: a pedal body, wherein the pedal body comprises a passage formed therein; a driving member, which is mounted in the pedal body; and a first cleat and a second cleat, which are coupled to the driving member, the first cleat and the second cleat being located in the passage, the first and second cleats being engageable with and thus attached to a clipless pedal, wherein when the driving member is operated in a first state, the first cleat and the second cleat are driven in such a way that the first cleat and the second cleat are moved toward each other in the passage and when the driving member is operated in a second state, the first cleat and the second cleat are driven in such a way that the first cleat and the second cleat are moved away from each other in the passage.

According to the above-described structure of the present invention, the driving member comprises a threaded rod and the threaded rod has an end portion on which a right-handed thread is formed and an opposite end portion on which a left-handed thread is formed.

According to the above-described structure of the present invention, the first cleat and the second cleat comprise threaded holes formed therein to correspond to and mate with the threaded rod and the threaded rod is received through the first cleat and the second cleat in mated engagement therewith.

According to the above-described structure of the present invention, the first cleat and the second cleat each have a bottom comprising an outside engaging lip.

According to the above-described structure of the present invention, the first cleat has a thickness greater than a thickness of the second cleat.

The present invention further provides a method for fitting an adjustable pedal on a clipless pedal, which comprises: providing a pedal body that comprises a passage formed therein; mounting a driving member in the pedal body in such a way that the driving member is located in the passage; coupling a first cleat and a second cleat to the driving member; operating the driving member in a first state so that the first cleat and the second cleat are moved toward each other in the passage or operating the driving member in a second state so that the first cleat and the second cleat are moved away from each other in the passage; and allowing the first cleat and the second cleat to engage with and attach to a clipless pedal after the operation of the first state or the second state.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
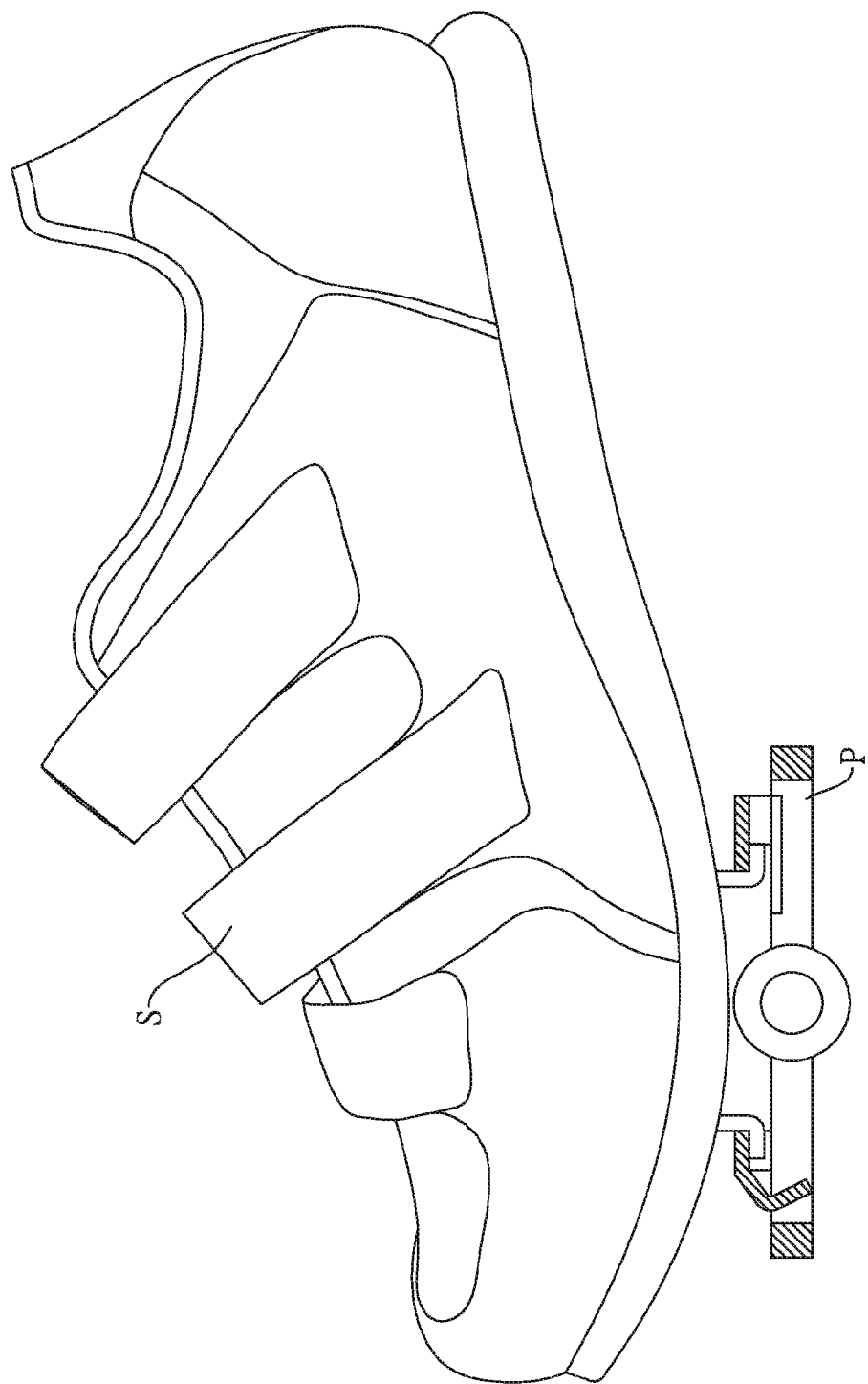
FIG. 1 is a schematic view showing a conventional clipless system.
Figure 2:
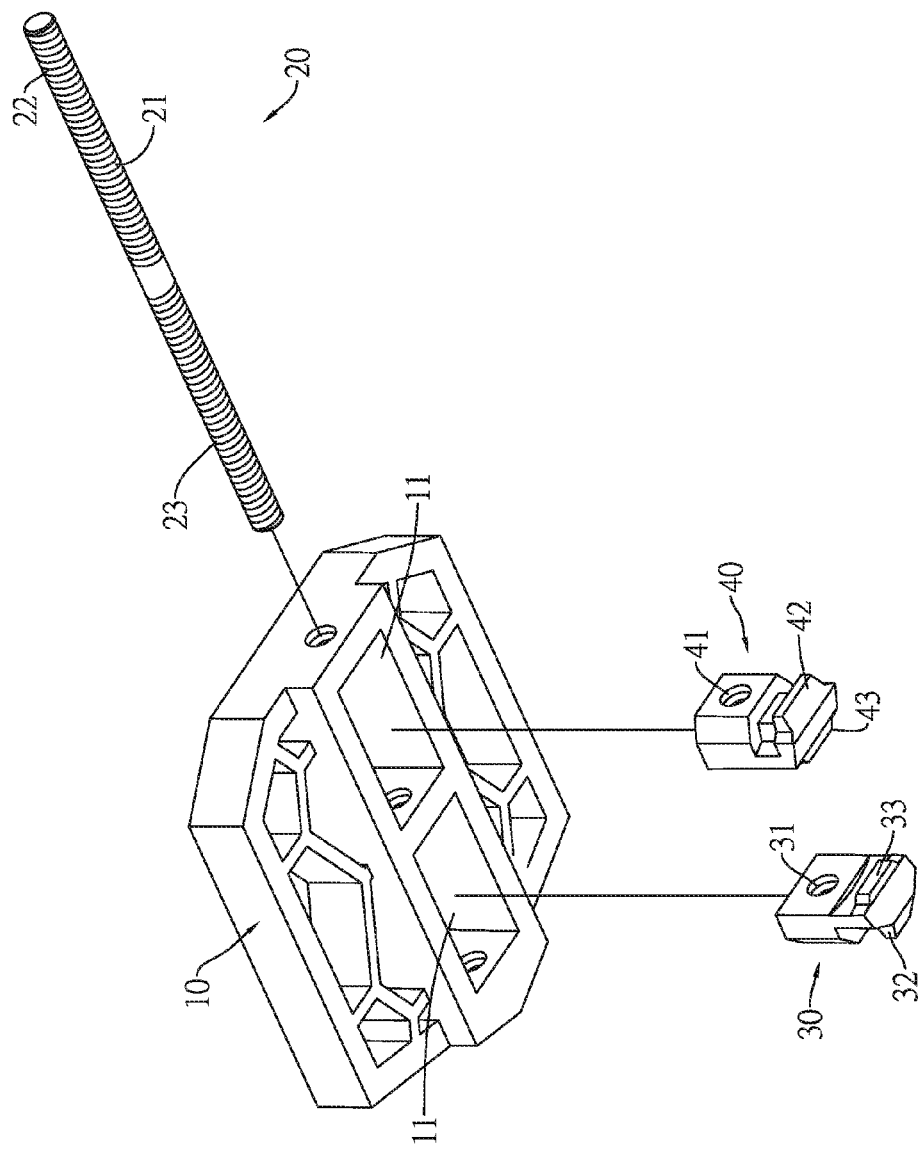
FIG. 2 is an exploded view of the present invention.
Figure 3:
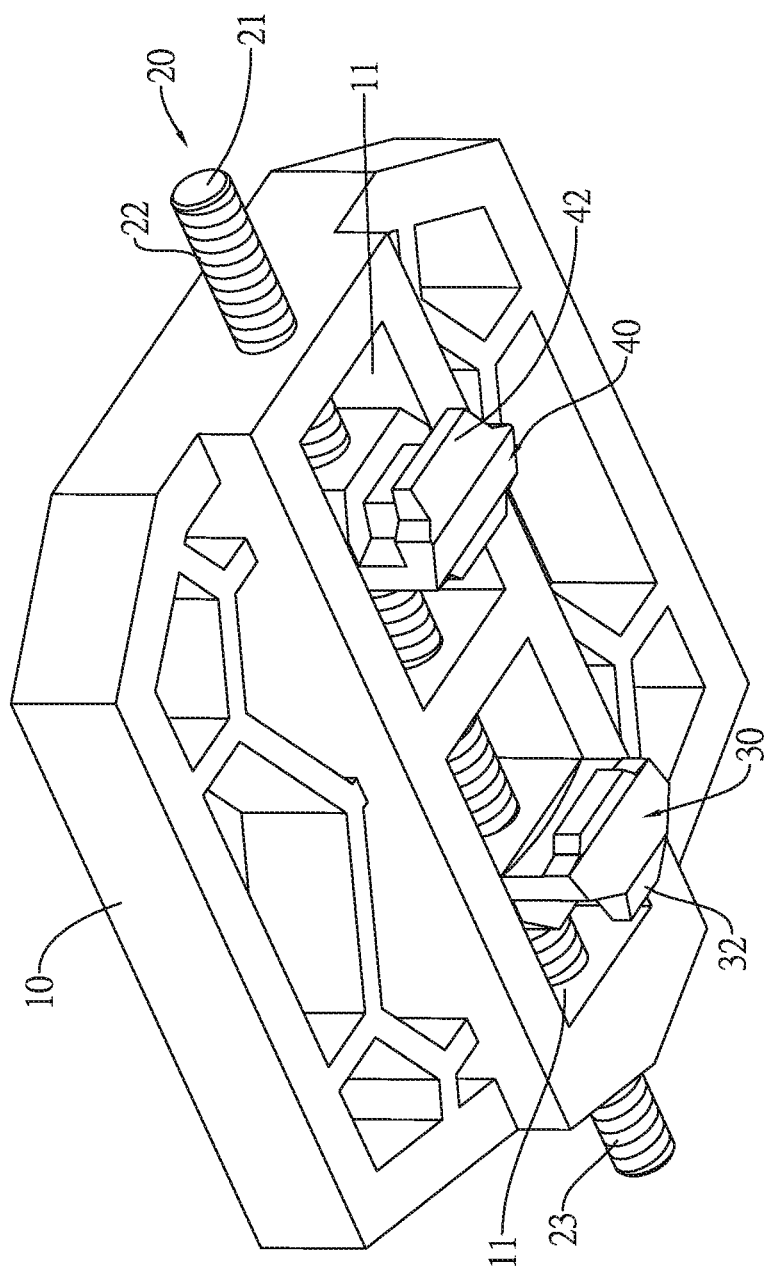
FIG. 3 is a perspective view showing the present invention.
Figure 4:
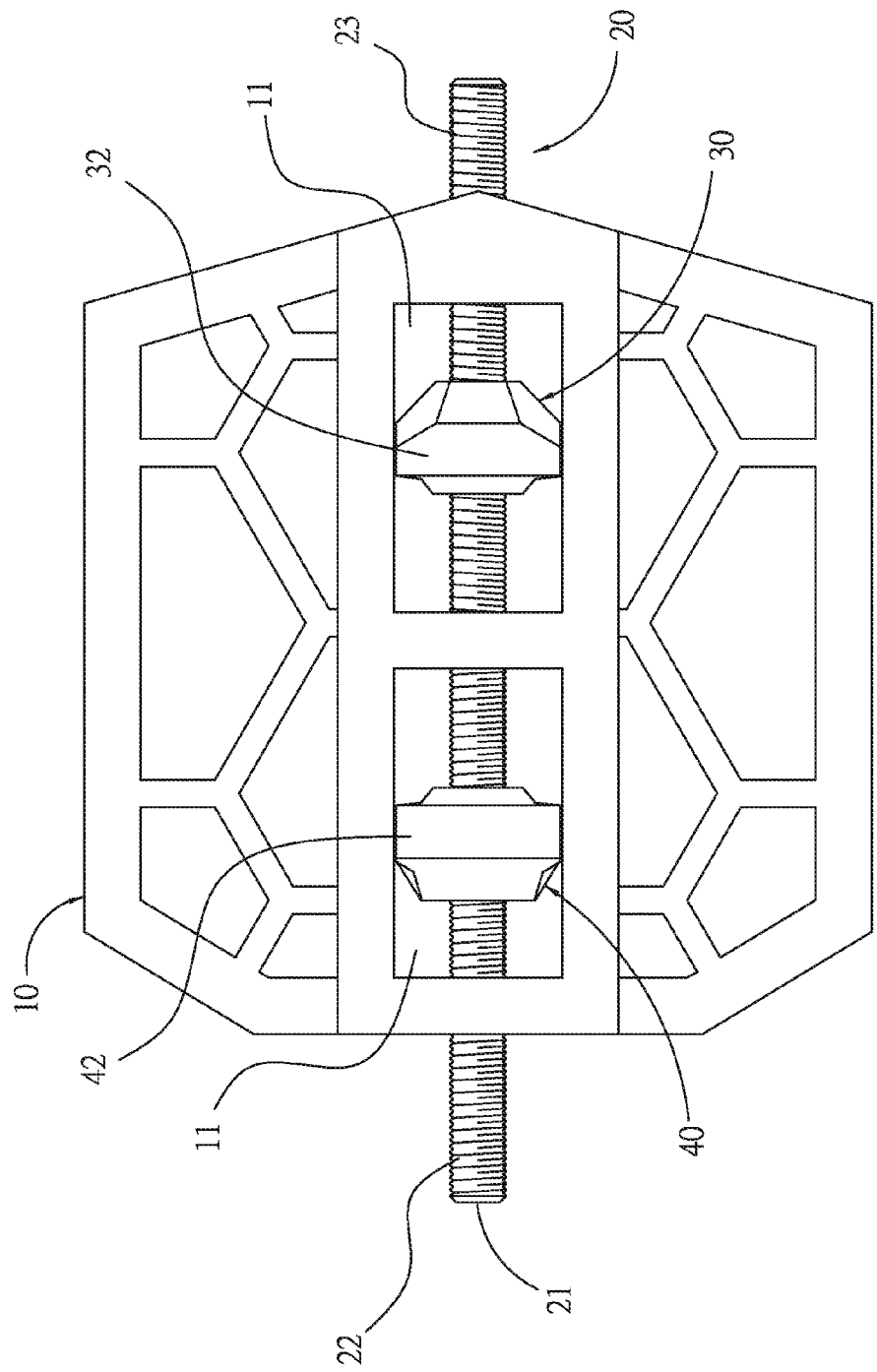
FIG. 4 is a top plan view of the present invention.
Figure 5:
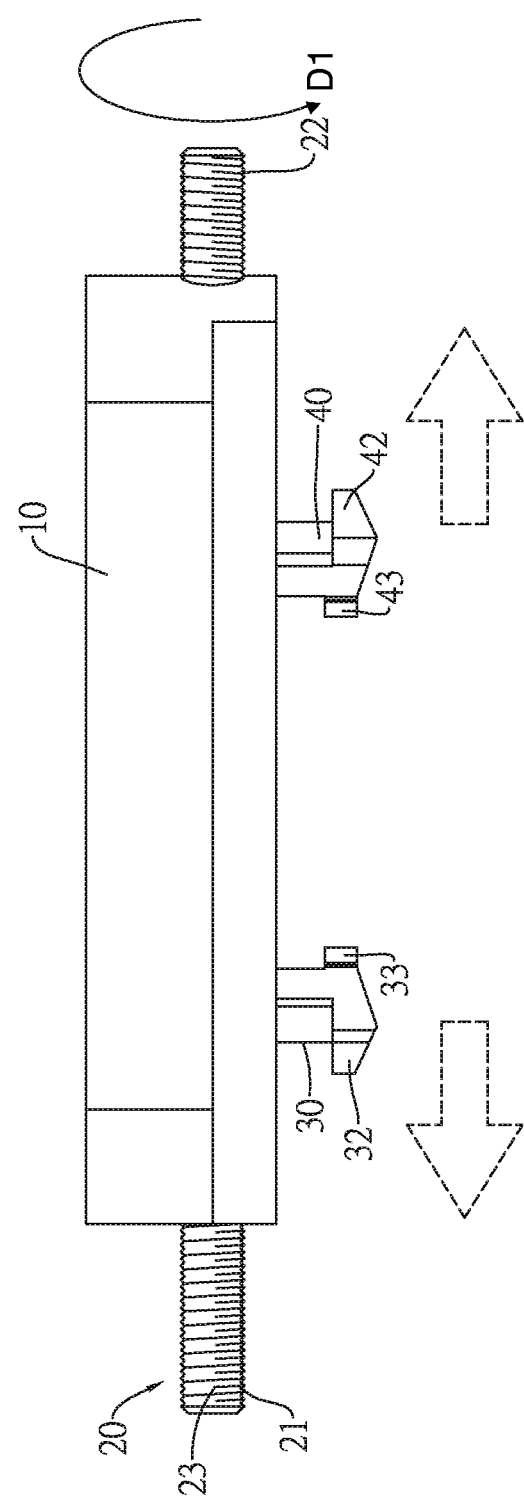
FIG. 5 is a view illustrating an operation of the present invention.
Figure 6:
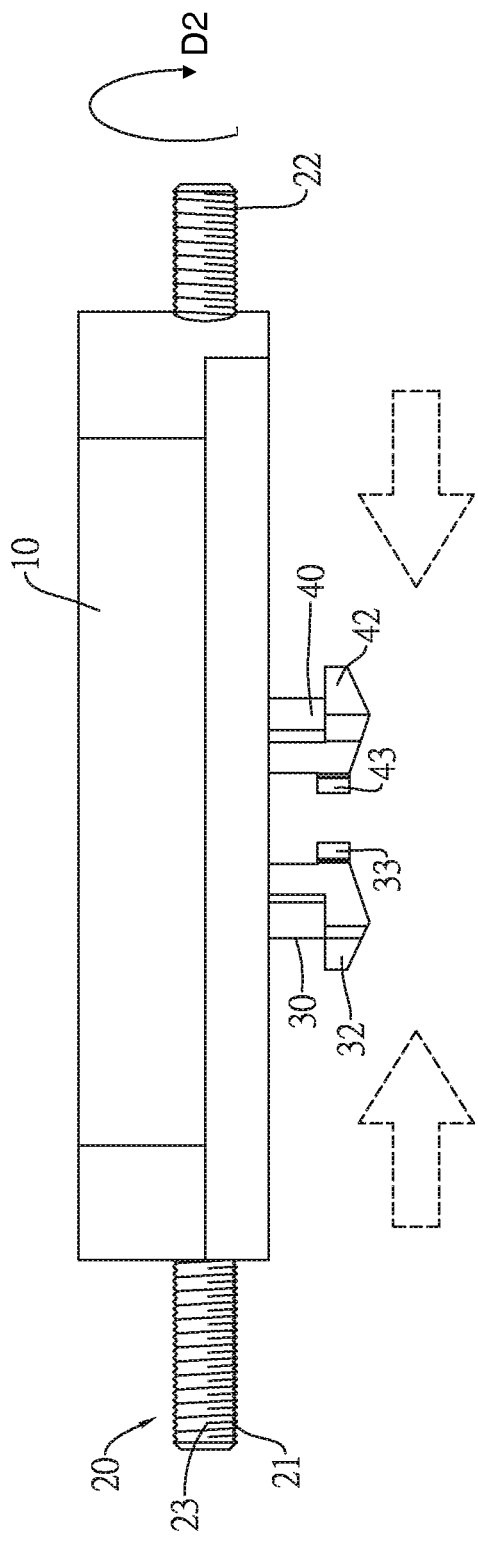
FIG. 6 is another view illustrating an operation of the present invention.

To allow a cyclist to easily change on the ground or on the pedals) without needing to engage or disengage from the pedals while riding a bicycle with clipless pedals, the present invention provides an adjustable pedal that is usable with a clipless pedal. Referring to the exploded view shown in FIG. 2, FIG. 2 shows a pedal body 10, a driving member 20, a first cleat 30, and a second cleat 40. Also referring to FIGS. 3 and 4, an assembled condition of these components is illustrated, where the pedal body 10 comprises a passage 11 formed therein and the driving member 20 is mounted in the pedal body 10. The first cleat 30 and the second cleat 40 are coupled to the driving member 20 and the first cleat 30 and the second cleat 40 are both located in the passage 11 of the pedal body 10. Further referring to FIGS. 5 and 6, FIG. 5 illustrates an operation of the present invention. When a rider operates the driving member 20 in a first state D1, the first cleat 30 and the second cleat 40 are driven in such a way that the first cleat 30 and the second cleat 40 are moved away from each other in the passage 11 (to form the situation shown in FIG. 7); oppositely, when the rider operates the driving member 20 in a second state D2, the first cleat 30 and the second cleat 40 are driven in such a way that the first cleat 30 and the second cleat 40 are moved toward each other in the passage 11, namely the situation shown in FIG. 8. From these descriptions, it can be understood that the present invention changes the distance between the first cleat 30 and the second cleat 40 to allow the pedal body 10 to engage and thus be mounted to conventional clipless pedals P, P', or P" (shown in FIGS. 7-9).

Figure 7:
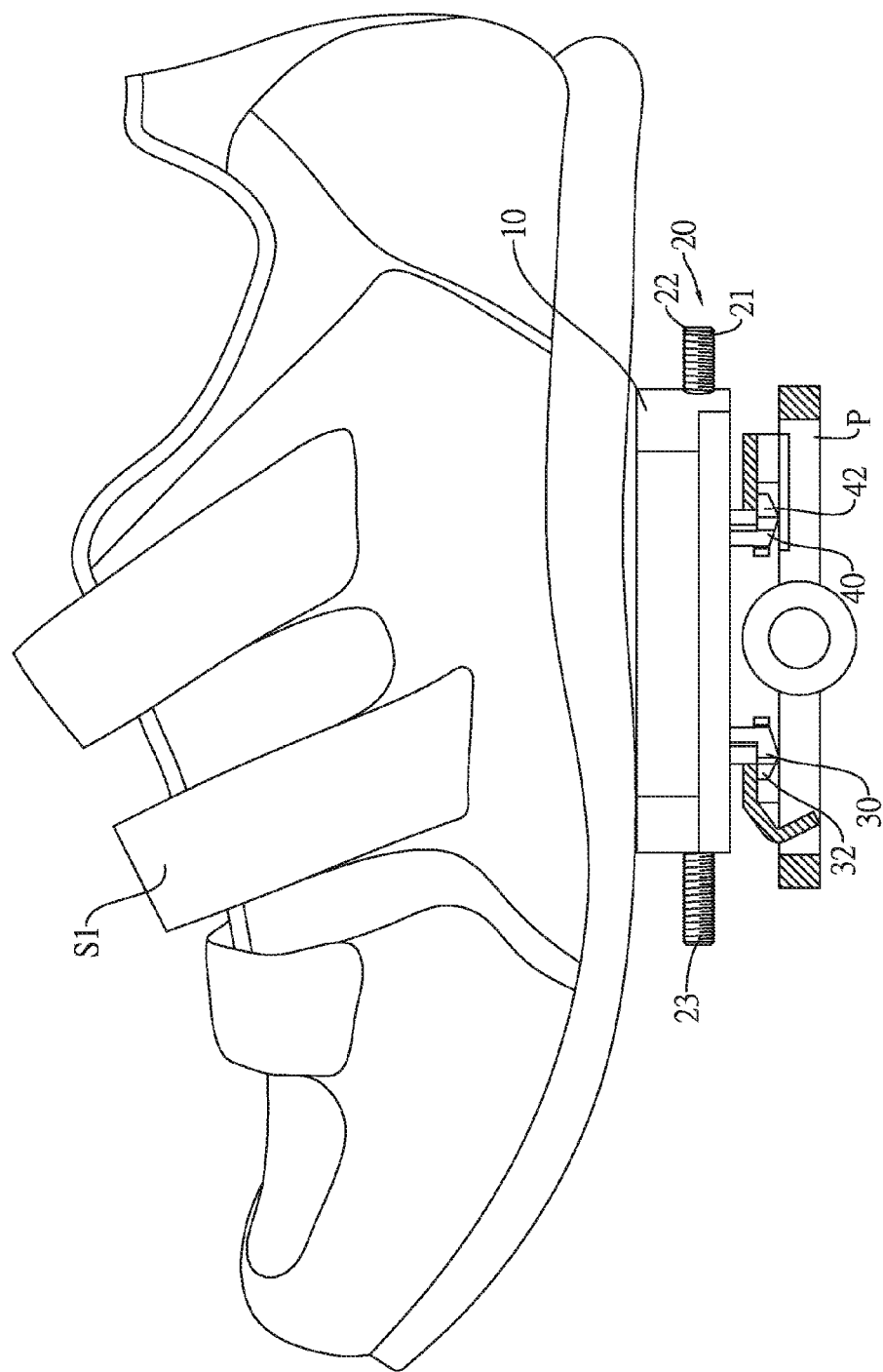
FIG. 7 is a schematic view showing the present invention mounted to a conventional clipless pedal.
Figure 8:
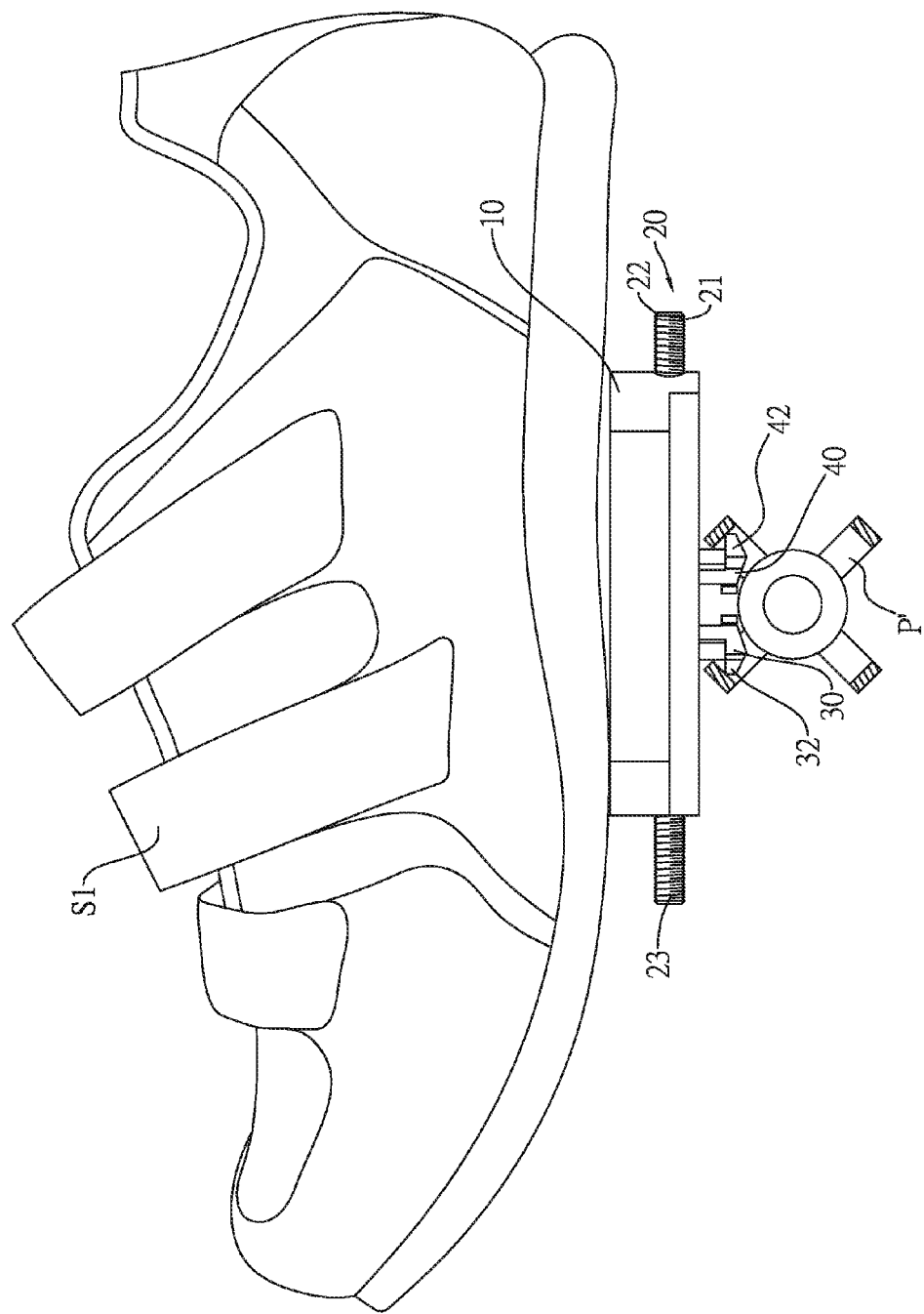
FIG. 8 is a schematic view showing the present invention mounted to another conventional clipless pedal.
Figure 9:
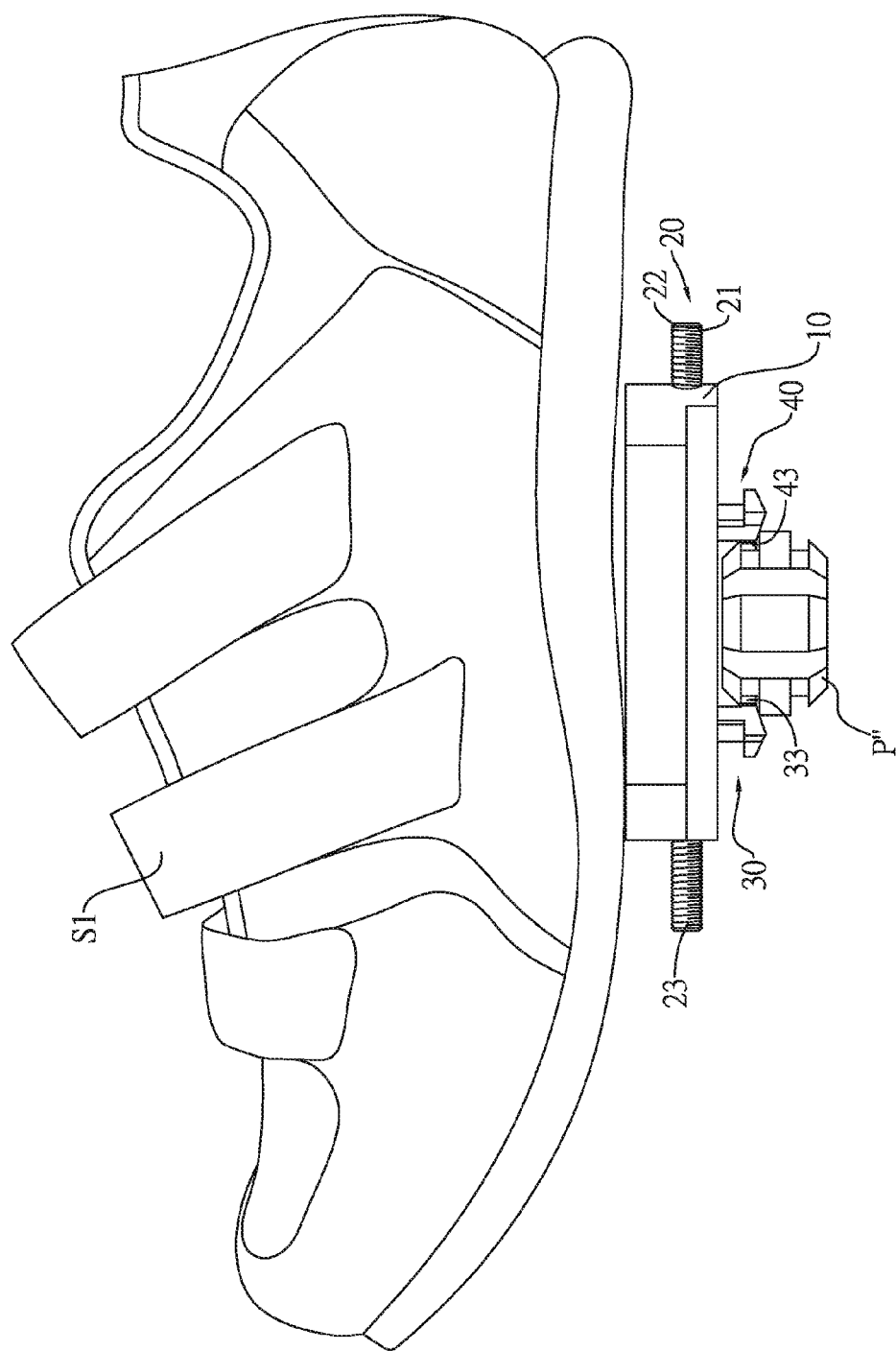
FIG. 9 is a schematic view showing the present invention mounted to a further conventional clipless pedal.

Further, collectively referring to FIGS. 2-9, the present invention also provides a method for attaching an adjustable pedal to a clipless pedal, comprising the following steps: providing a pedal body 10 that comprises a passage 11 formed therein; mounting a driving member 20 in the pedal body 10 in such a way that the driving member 20 is located in the passage 11 to couple a first cleat 30 and a second cleat 40 to the driving member 20; operating the driving member 20 in a first state D1 to cause the first cleat 30 and the second cleat 40 to move away from each other in the passage 11 and operating the driving member 20 in a second state D2 to cause the first cleat 30 and the second cleat 40 to move toward each other in the passage 11; and setting the first cleat 30 and the second cleat 40 to engage a clipless pedal P, P', or P" (as shown in FIGS. 7-9) after the operation of the first state or the second state.

An alternative embodiment of the present invention will be described and such an alternative embodiment is just one of a variety of feasible embodiments of the present invention and is not provided for limiting the scope of the present invention. Continuing referring to FIGS. 2-9, the present invention provides an adjustable pedal usable with a clipless pedal and a method for attaching an adjustable pedal to a clipless pedal, wherein a driving member comprises a threaded rod 21 and the threaded rod 21 has one end section on which a left-handed thread 22 is formed and an opposite end section on which a right-handed thread 23 is formed. To accommodate to the driving member 20 that adopts such a threaded rod 21, a first cleat 30 and a second cleat 40 are respectively provided with threaded hole 31, 41 corresponding to and mating the threaded rod 21. The first cleat 30 and the second cleat 40 are coupled to the threaded rod 21 in such a way that the threaded rod 21 extends through the first cleat 30 and the second cleat 40.

Further, for a more detailed description, the first cleat 30 and the second cleat 40 each have a bottom end that comprises an outside engaging lip 32, 42 and an inside engaging lip 33, 43. With such an arrangement, when a rider rotates the threaded rod 21 in a first direction (where the operation of the first state is carried out) D1, due to the arrangement of the right-handed thread 22 and the left-handed thread 23 on the threaded rod 21, the first cleat 30 and the second cleat 40 through which the threaded rod 21 extends in a threadingly mated manner are caused to move away from each other in the passage 11; when the rider rotates the threaded rod 21 in a second direction (where the operation of the second state is carried out) D2, the first cleat 30 and the second cleat 40 are caused to move toward each other in the passage 11. For further description, the first cleat 30 and the second cleat 40 are of sizes that correspond to the width of the passage 11 so that the first cleat 30 and the second cleat 40 are prohibited from rotation with the threaded rod 21 and when the threaded rod 21 is rotated, the first cleat 30 and the second cleat 40 are caused to move in directions that are opposite to each other along a longitudinal axis of the passage 11 of the pedal body 10. The outside engaging lip 32, 42 allow the first cleat 30 and the second cleat 40 to get engagement with conventional clipless pedals P, P' as shown in FIGS. 7 and 8, or alternatively, as shown in FIG. 9, the inside engaging lip 33, 43 can be moved toward each other to engage a conventional clipless pedal P".

It is generally known that bicycles that are currently available in the market can be generally classified in two categories, one being road bicycles and the other being mountain bicycles, each being fit to its own cleat shoes and clipless pedals. The pedal body 10 provided in the present invention is fit to the clipless pedals of both the road bicycles and the mountain bicycles. In an embodiment of the present invention, the thickness of the first cleat 30 is mater than the thickness of the second cleat 40, so that the pedal body 10 of the present invention can be easily mounted to various types of clipless pedals. In an arrangement where the thinner second cleat 40 is set at the front side, while the thicker first cleat 30 at the rear side, the pedal body 10 of the present invention can be easily mounted to a mountain biking clipless pedal of Shimano® SPD (which is a variant of the clipless system). Further, as described above, the first cleat 30 and the second cleat 40 each have an outside engaging lip 32, 42 and/or an inside engaging lip 33, 43 and this arrangement allows the pedal body 10 of the present invention to be easily mounted to a clipless pedal P, P' of Speedplay® (which is a brand name) (Shimano® and Speedplay® are commonly known brands and their structures constitute no novel part of the present invention and are not shown in the drawings.) Further, although some known brands of the conventional clipless pedals are mentioned herein, they are provided for easy reference to those having ordinary skills in the art, but are not limited to those mentioned herein. The outside engaging lip 32, 42 and/or the inside engaging lip 33, 43 can be used to engage and attach to clipless pedals having similar structures provided by other brand names.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An adjustable platform pedal for use with a clipless pedal, comprising:
   a pedal body which comprises two longer opposing sidewalls and two shorter opposing sidewalls between which forms a rectangular passage within the pedal body, with the two longer opposing sidewalls facing each other in a longitudinal direction and the two shorter opposing sidewalls facing each other in a latitudinal orientation perpendicular to the longitudinal direction;
   a driving member, which is mounted in the pedal body, comprising a threaded rod, the threaded rod having an end portion on which a right-handed thread is formed and an opposite end portion on which a left-handed thread is formed; and
   a first cleat and a second cleat, which are coupled to the driving member, the first cleat and the second cleat being located in the passage and adapted to engage with and attach to a clipless pedal, each of the first and second cleats having lateral side surfaces that are opposite to each other in the latitudinal orientation, the first cleat and the second cleat being subject to move toward or away from each other in the longitudinal direction with respect to the pedal body by the rotation of the threaded rod of the driving member.

2. The adjustable pedal according to claim 1, wherein the first cleat and the second cleat comprise threaded holes formed therein to correspond to and mate with the threaded rod, the threaded rod being received through the first cleat and the second cleat in mated engagement therewith.

3. The adjustable pedal according to claim 2, wherein the first cleat has a thickness greater than a thickness of the second cleat.

4. The adjustable pedal according to claim 1, wherein the first cleat and the second cleat each have a bottom comprising two ends that are opposite to each other in the first direction and an outside engaging lip and an inside engaging lip are respectively formed on the two ends and extend in opposite directions from the cleat for engaging the clipless pedal, the inside engaging lips of the first and second cleats facing each other, the outside engaging lips of the first and second cleats facing away from each other.

5. The adjustable pedal according to claim 4, wherein the first cleat has a thickness greater than a thickness of the second cleat.

6. The adjustable pedal according to claim 1, wherein the first cleat has a thickness greater than a thickness of the second cleat.

\* \* \* \* \*